(12) United States Patent
Iwamatsu

(10) Patent No.: US 11,768,708 B2
(45) Date of Patent: Sep. 26, 2023

(54) MEDIA DATA PROCESSING SYSTEM, METHOD, AND PROGRAM

(71) Applicant: NEC Corporation, Tokyo (JP)

(72) Inventor: Yosuke Iwamatsu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 314 days.

(21) Appl. No.: 17/294,055

(22) PCT Filed: Nov. 19, 2018

(86) PCT No.: PCT/JP2018/042672
§ 371 (c)(1),
(2) Date: May 14, 2021

(87) PCT Pub. No.: WO2020/105091
PCT Pub. Date: May 28, 2020

(65) Prior Publication Data
US 2022/0027198 A1    Jan. 27, 2022

(51) Int. Cl.
*G06F 9/50* (2006.01)
(52) U.S. Cl.
CPC .................... *G06F 9/505* (2013.01)
(58) Field of Classification Search
CPC .............. G06F 9/505; G06F 9/5083
See application file for complete search history.

(56) References Cited

U.S. PATENT DOCUMENTS

| 2017/0235614 A1* | 8/2017 | Choe ............... G06F 9/5016 718/104 |
| 2017/0372046 A1* | 12/2017 | Thomee ........... G06Q 30/0277 |
| 2019/0041963 A1* | 2/2019 | Singh ............... G01J 5/0275 |

(Continued)

FOREIGN PATENT DOCUMENTS

| JP | H03-028939 A | 2/1991 |
| JP | 2007-156541 A | 6/2007 |
| JP | 4411296 B2 | 2/2010 |

(Continued)

OTHER PUBLICATIONS

Japanese Office Communication for JP Application No. 2020-557042 dated Jun. 7, 2022 with English Translation.

(Continued)

*Primary Examiner* — Sisley N Kim
(74) *Attorney, Agent, or Firm* — Sughrue Mion, PLLC

(57) ABSTRACT

To provide a media data processing system that can suppress a decrease in a request processing rate while suppressing an increase in response time in media data recognition processing where it is difficult to properly estimate the load. A first load estimation unit 5 estimates range of processing load of media data recognition processing based on header information of media data. A determination unit 31 determines whether to allow or disallow execution of the media data recognition processing, or to estimate the processing load, based on the range of the processing load. A second load estimation unit 6 estimates the processing load of the media data recognition processing based on content of the media data when it is determined to estimate the processing load. The determination unit 31 determines whether to allow or disallow the execution of the media data recognition processing based on the processing load.

9 Claims, 17 Drawing Sheets

(56) References Cited

U.S. PATENT DOCUMENTS

2019/0213052 A1\* 7/2019 Arikuma .................. G06F 9/50

FOREIGN PATENT DOCUMENTS

| | | |
|---|---|---|
| JP | 2012-028948 A | 2/2012 |
| WO | 2013/121711 A1 | 8/2013 |
| WO | 2018/061825 A1 | 4/2018 |

OTHER PUBLICATIONS

International Search Report for PCT Application No. PCT/JP2018/042672, dated Jan. 15, 2019.
English translation of Written opinion for PCT Application No. PCT/JP2018/042672, dated Jan. 15, 2019.

\* cited by examiner

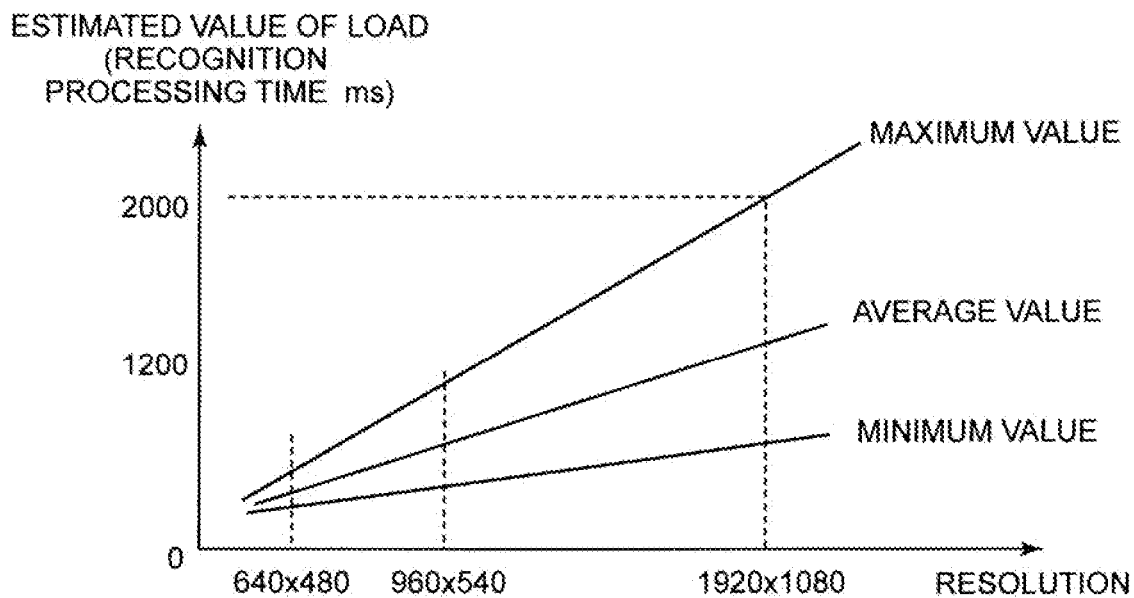

|  | NUMBER OF HUMAN FACES | ESTIMATED PROCESSING LOAD (ms) | ESTIMATION PROCESSING TIME (ms) |
|---|---|---|---|
| IMAGE DATA 2 | 8 | AVERAGE VALUE 800 | 200 |
| IMAGE DATA 3 | 2 | AVERAGE VALUE 400 | 200 |

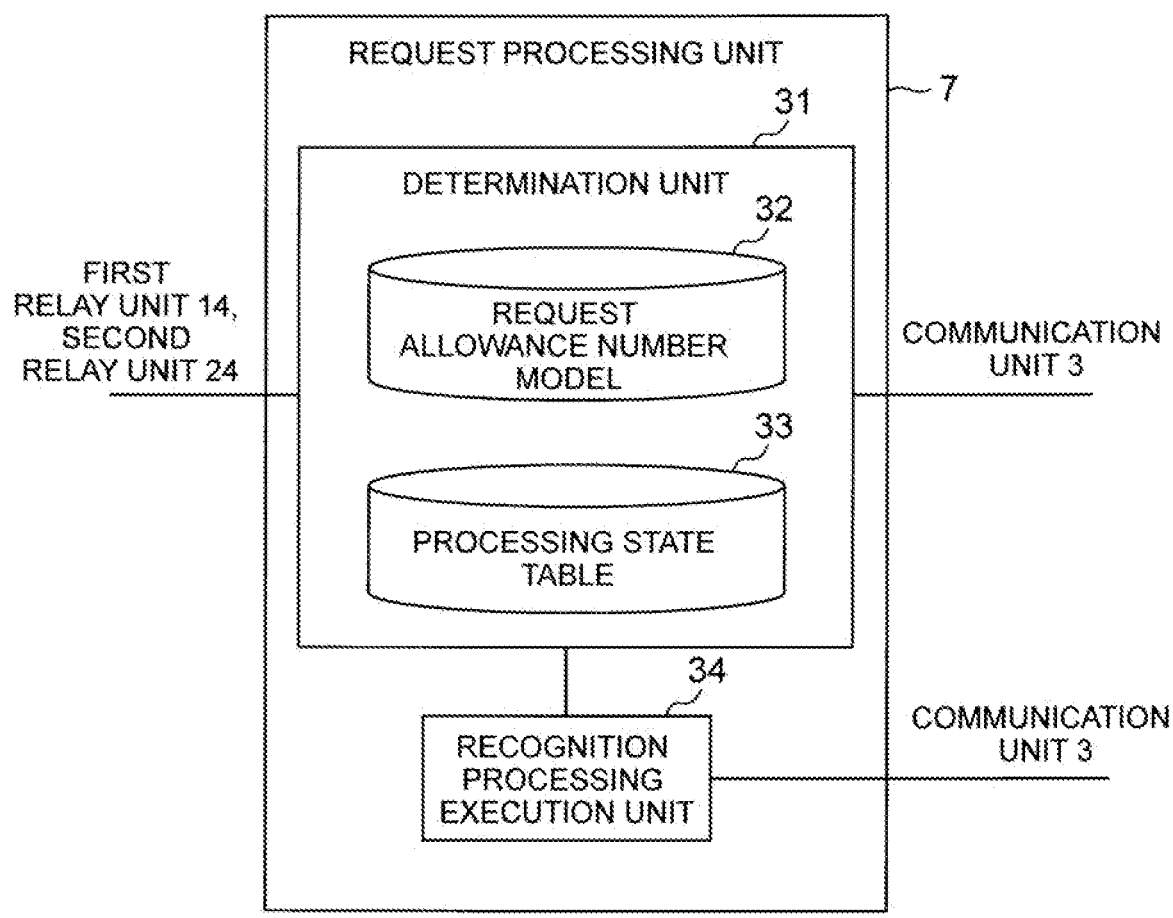

FIG. 9

| LOAD RANGE OF RECOGNITION PROCESSING (ms) | NUMBER OF REQUESTS FOR WHICH RECOGNITION PROCESSING IS BEING PERFORMED |
|---|---|
| 0 to 500 | 1 |
| over 500 | 2 |

| TOTAL VALUE |
|---|
| 3 |

FIG. 10

| | RESOLUTION | ESTIMATED RANGE OF PROCESSING LOAD (ms) | ESTIMATION PROCESSING TIME (ms) | DETERMINATION RESULT |
|---|---|---|---|---|
| IMAGE DATA 1 | 1920x1080 | MINIMUM VALUE 600, AVERAGE VALUE 1300, MAXIMUM VALUE 2000 | 0 | DISALLOWED |
| IMAGE DATA 2 | 960x540 | MINIMUM VALUE 200, AVERAGE VALUE 700, MAXIMUM VALUE 1200 | 0 | TO ESTIMATE PROCESSING LOAD |
| IMAGE DATA 3 | 960x540 | MINIMUM VALUE 200, AVERAGE VALUE 700, MAXIMUM VALUE 1200 | 0 | TO ESTIMATE PROCESSING LOAD |
| IMAGE DATA 4 | 640x480 | MINIMUM VALUE 100, AVERAGE VALUE 200, MAXIMUM VALUE 300 | 0 | ALLOWED |

FIG. 11

| | NUMBER OF HUMAN FACES | ESTIMATED PROCESSING LOAD (ms) | ESTIMATION PROCESSING TIME (ms) | DETERMINATION RESULT |
|---|---|---|---|---|
| IMAGE DATA 2 | 8 | AVERAGE VALUE 800 | 200 | DISALLOWED |
| IMAGE DATA 3 | 2 | AVERAGE VALUE 400 | 200 | ALLOWED |

FIG. 14

| | PROCESS OF STEPS S2 TO S4 (FIRST STAGE) | | PROCESS OF STEPS S5 TO S7 (SECOND STAGE) | | STEP S8 | ACCUMULATION |
|---|---|---|---|---|---|---|
| | ESTIMATION PROCESSING TIME $T_1$ (ms) | DETERMINATION RESULT IN STEP S4 | ESTIMATION PROCESSING TIME $T_2$ (ms) | DETERMINATION RESULT IN STEP S7 | TIME REQUIRED FOR THE RECOGNITION PROCESSING (ms) | RESPONSE TIME (ms) |
| IMAGE DATA 1 | 0 | DISALLOWED | | | | |
| IMAGE DATA 2 | 0 | TO ESTIMATE PROCESSING LOAD | 200 | DISALLOWED | | |
| IMAGE DATA 3 | 0 | TO ESTIMATE PROCESSING LOAD | 200 | ALLOWED | ASSUME TO BE 400 | 600 |
| IMAGE DATA 4 | 0 | ALLOWED | | | ASSUME TO BE 200 | 200 |

REQUEST PROCESSING RATE: 50%
AVERAGE RESPONSE TIME: 400ms

FIG. 15

| | PROCESS OF STEPS S2 TO S4 (FIRST STAGE) | | STEP S8 | ACCUMULATION |
|---|---|---|---|---|
| | ESTIMATION PROCESSING TIME $T_1$ (ms) | DETERMINATION RESULT | TIME REQUIRED FOR THE RECOGNITION PROCESSING (ms) | RESPONSE TIME (ms) |
| IMAGE DATA 1 | 0 | DISALLOWED | | |
| IMAGE DATA 2 | 0 | DISALLOWED | | |
| IMAGE DATA 3 | 0 | DISALLOWED | | |
| IMAGE DATA 4 | 0 | ALLOWED | ASSUME TO BE 200 | 200 |

REQUEST PROCESSING RATE: 25%
AVERAGE RESPONSE TIME: 200ms

FIG. 16

| | PROCESS OF STEPS S5 TO S7 (SECOND STAGE) | | STEP S8 | ACCUMULATION |
|---|---|---|---|---|
| | ESTIMATION PROCESSING TIME $T_2$ (ms) | DETERMINATION RESULT | TIME REQUIRED FOR THE RECOGNITION PROCESSING (ms) | RESPONSE TIME (ms) |
| IMAGE DATA 1 | 200 | DISALLOWED | | |
| IMAGE DATA 2 | 200 | DISALLOWED | | |
| IMAGE DATA 3 | 200 | ALLOWED | ASSUME TO BE 400 | 600 |
| IMAGE DATA 4 | 200 | ALLOWED | ASSUME TO BE 200 | 400 |

REQUEST PROCESSING RATE: 50%
AVERAGE RESPONSE TIME: 500ms

MEDIA DATA PROCESSING SYSTEM, METHOD, AND PROGRAM

This application is a National Stage Entry of PCT/JP2018/042672 filed on Nov. 19, 2018, the contents of all of which are incorporated herein by reference, in their entirety.

TECHNICAL FIELD

The present invention relates to a media data processing system, a media data processing method, and a media data processing program for determining whether or not to allow media data recognition processing to be performed on media data.

BACKGROUND ART

Media data is image data, sound data, or video data. Here, image data is data that represents still images, and video data is data that represents moving images. Therefore, video data can also be referred to as moving image data.

The media data recognition processing is the process of recognizing people and objects represented by the media data. An example of media data recognition processing is the process of recognizing who the person in the image represented by the image data is, or what the object in the image represented by the image data is. Another example of media data recognition processing is the process of recognizing whose voice is represented by the sound data or what sound is represented by the sound data. These processes are examples of media data recognition processing, and media data recognition processing is not limited to the above examples. Hereinafter, the media data recognition processing may be referred to simply as the recognition processing.

In addition, header information that indicates the attributes and summary of the media data is added to the media data.

Also, PTL 1 describes a device that measures the CPU (Central Processing Unit) load factor at the time in response to a new processing request from an operator, and further calculates the predicted load factor in case the processing request is executed, and then determines whether or not the requested processing can be executed.

Also, PTL 2 describes a device that selectively restricts certain request patterns that are considered to be highly effective in reducing the load on the server.

CITATION LIST

Patent Literature

PTL 1: Japanese Patent Application Laid-Open No. H03-28939
PTL 1: Japanese Patent No. 4411296

SUMMARY OF INVENTION

Technical Problem

In general, when resources (computing resources) are occupied by requests with long processing times (in other words, requests with high loads), other requests cannot be processed. Then, the sender (e.g., the client) of the request that cannot be processed is notified that it is not allowed to process the request. In this case, the request processing rate will decrease. The request processing rate is the ratio of the number of requests that have been processed to the number of requests that have been generated.

Here, it is possible to improve the request processing rate by selectively disallowing the execution of processing for requests that are estimated to have a high load.

In the media data recognition processing, the load varies depending on the content of the media data. Therefore, it is difficult to properly estimate the load of the recognition processing according to the media data.

When the load of the recognition processing is estimated based on the attribute values represented by the header information of the media data, the accuracy of the load estimation is low.

When the load of the recognition processing is estimated based on the content of the media data, the accuracy of the load estimation is high, but the response time (time to complete the recognition processing) increases because of the time required for the load estimation process.

When it is difficult to accurately estimate the load of recognition processing, such as in media data recognition processing, or when the load estimation process may take a long time to accurately estimate the load of recognition processing, it is desirable to be able to suppress the decrease in the request processing rate while suppressing the increase in response time.

In addition, the PTL 1 and 2 do not describe performing recognition processing on media data with varying loads of recognition processing.

It is an object of the present invention to provide a media data processing system, a media data processing method, and a media data processing program that can suppress the decrease in a request processing rate while suppressing the increase in response time in media data recognition processing where it is difficult to properly estimate the load.

Solution to Problem

A media data processing system according to the present invention comprises a first load estimation unit that estimates range of processing load of media data recognition processing based on header information of media data; a second load estimation unit that estimates the processing load of the media data recognition processing based on content of the media data; and a determination unit that determines whether to allow or disallow execution of the media data recognition processing on the media data, or to estimate the processing load, based on the range of the processing load estimated by the first load estimation unit and information indicating available computing resources, and determines whether to allow or disallow the execution of the media data recognition processing on the media data, based on the processing load estimated by the second load estimation unit and the information indicating available computing resources, wherein the second load estimation unit estimates the processing load of the media data recognition processing when the determination unit determines to estimate the processing load.

A media data processing method according to the present invention comprises estimating range of processing load of media data recognition processing based on header information of media data; determining whether to allow or disallow execution of the media data recognition processing on the media data, or to estimate the processing load, based on the range of the processing load and information indicating available computing resources; estimating the processing load of the media data recognition processing based on content of the media data when it is determined to estimate the processing load; and determining whether to allow or disallow the execution of the media data recognition processing on the media data, based on the processing load and the information indicating available computing resources.

A media data processing program according to the present invention causes a computer to execute: a first load estimation process of estimating range of processing load of media data recognition processing based on header information of media data; a second load estimation process of estimating the processing load of the media data recognition processing based on content of the media data; and a determination process of determining whether to allow or disallow execution of the media data recognition processing on the media data, or to estimate the processing load, based on the range of the processing load estimated in the first load estimation process and information indicating available computing resources, and of determining whether to allow or disallow the execution of the media data recognition processing on the media data, based on the processing load estimated in the second load estimation process and the information indicating available computing resources, wherein the media data processing program causes the computer to execute: the second load estimation process when it is determined to estimate the processing load in the determination process.

Advantageous Effects of Invention

According to this invention, in media data recognition processing, where it is difficult to properly estimate the load, it is possible to suppress the decrease in the request processing rate while limiting the increase in response time.

BRIEF DESCRIPTION OF DRAWINGS

FIG. 3 It depicts a schematic diagram of an example of the first load model.

FIG. 4 It depicts a schematic diagram of an example of estimated ranges of processing loads.

FIG. 7 It depicts a block diagram showing the request processing unit 7 in more detail.

FIG. 8 It depicts a schematic diagram of an example of a request allowance number model.

FIG. 9 It depicts a schematic diagram of an example of a processing state table.

FIG. 10 It depicts an explanatory view showing the determination result in case the range of processing load shown in FIG. 4 is given.

FIG. 11 It depicts an explanatory view showing the determination result in case the processing load shown in FIG. 6 is given.

FIG. 14 It depicts an explanatory view showing the determination result and response time when the exemplary embodiment of the present invention is applied to the image data 1 to 4 shown in FIG. 4.

FIG. 15 It depicts an explanatory view showing the determination result and response time in the case where only the first stage is applied to the image data 1 to 4 shown in FIG. 4 and it is assumed that only the determination result of either "Allow" or "Disallow" is obtained in step S4.

FIG. 16 It depicts an explanatory view showing the determination result and response time in the case where only the second stage is applied to the image data 1 to 4 shown in FIG. 4 and the determination result of either "Allow" or "Disallow" is assumed to be obtained in step S7.

DESCRIPTION OF EMBODIMENTS

An exemplary embodiment of the present invention will be described below with reference to the drawings. As already mentioned, the media data recognition processing may be referred to simply as the recognition processing.

Figure 1:
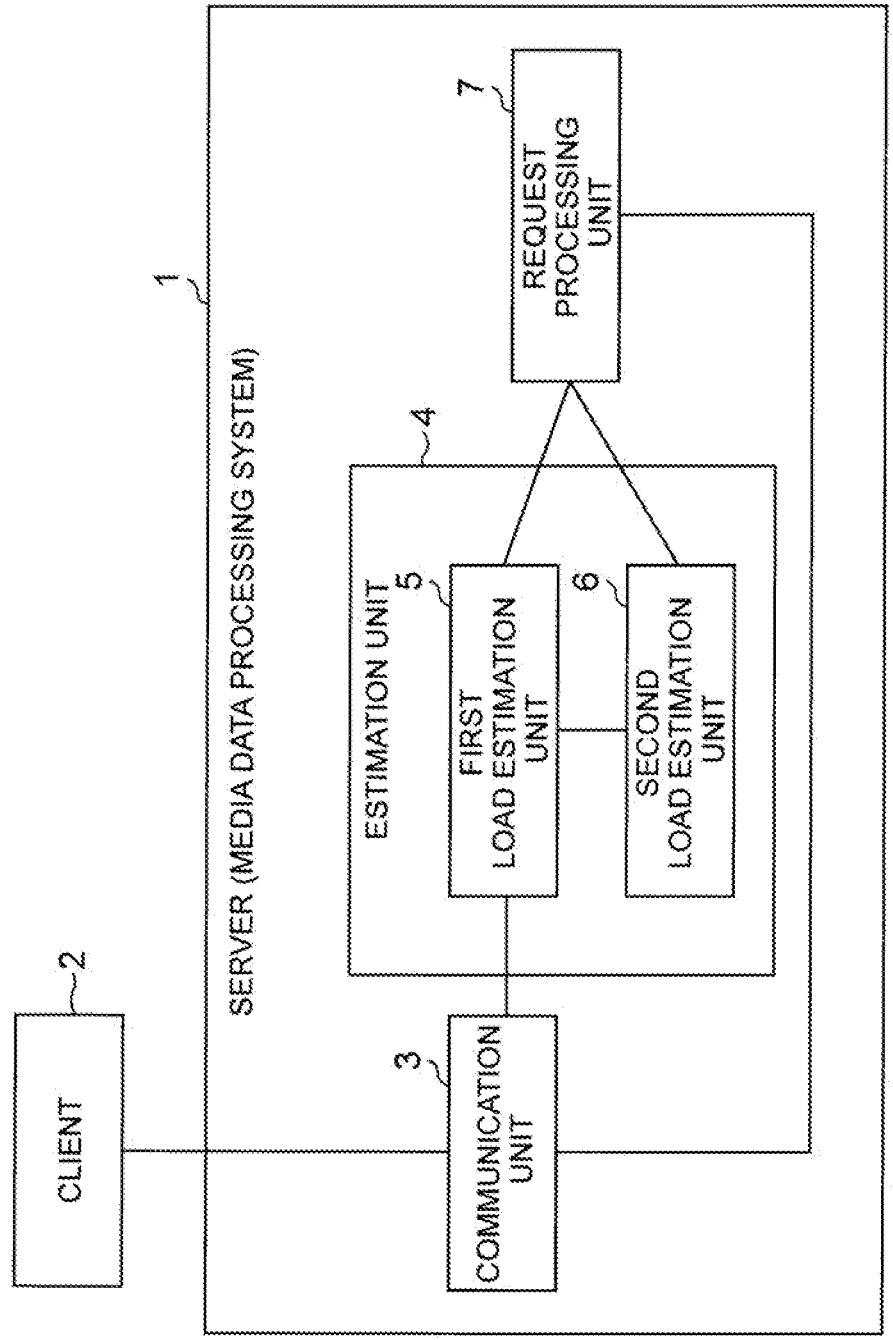
FIG. 1 It depicts a block diagram showing an example of a media data processing system of an exemplary embodiment of the present invention.

FIG. 1 is a block diagram showing an example of a media data processing system of an exemplary embodiment of the present invention. FIG. 1 illustrates a case where the server 1 of a client-server system corresponds to a media data processing system. In the following description, the media data processing system will be referred to as server 1. A client 2 is communicatively connected to the server 1.

In the following explanation, we will use the case where the media data is image data as an example. The case where the media data is sound data or video data (moving image data) will be described later. As mentioned above, media data has header information that indicates the attributes and summary of the media data. When the media data is image data, the header information of the image data represents, for example, attribute values such as the resolution of the image, the number of channels of the image, and the number of bits per pixel of the image. The resolution of the image can be referred to as the size of the image. The number of channels of the image is, for example, 1 if the image is a monochrome image, and 3 if the image is a color image.

The client 2 sends media data (in this case, image data) and a request for recognition processing (media data recognition processing) for the image data to the server 1.

The server (media data processing system) 1 is equipped with a communication unit 3, an estimation unit 4, and a request processing unit 7.

The communication unit 3 receives the image data and the request for recognition processing on the image data from the client 2. When the server 1 determines that the execution of the requested recognition processing is disallowed, the communication unit 3 transmits the determination result to the client 2. If the requested recognition processing is executed, the communication unit 3 sends the result of the recognition processing to the client 2.

The estimation unit 4 estimates the range of the processing load of the recognition processing and the processing load of the recognition processing on the image data sent by the client 2. In this exemplary embodiment, the processing load of recognition processing is expressed in terms of the time required for recognition processing. The time required for recognition processing is also described as the recognition processing time.

The estimation unit 4 is equipped with a first load estimation unit 5 and a second load estimation unit 6.

The first load estimation unit 5 estimates the range of the processing load of the recognition processing on the image data based on the header information of the image data. More specifically, the first load estimation unit 5 obtains a first index for estimating the processing load of the recognition processing based on the header information of the image data, and estimates the range of the processing load of the recognition processing based on the first index. The first load estimation unit 5 reads at least one of the resolution of the image, the number of channels of the image, and the number of bits per pixel of the image, which is represented by the header information of the image data, from the header information as the first index, and estimates the range of the processing load of the recognition processing based on the first index. In other words, the first load estimation unit 5 estimates the range of the processing load of the recognition processing based on at least one of the resolution, the number of channels, and the number of bits per pixel represented by the header information of the image data.

The second load estimation unit 6 estimates the load of recognition processing on the image data based on the content of the image data. More specifically, the second load estimation unit 6 obtains a second index for estimating the processing load of the recognition processing based on the content of the image data and estimates the processing load of the recognition processing based on the second index. The second load estimation unit 6 derives information about the subject in the image represented by the image data as the second index, and estimates the processing load of the recognition processing based on the second index. In other words, the second load estimation unit 6 estimates the processing load of the recognition processing based on the information about the subject in the image represented by the image data. In the following explanation, we use the case where the information about the subject in the image is the number of human faces in the image as an example, but it is not limited to this example. For example, the subject may be an object.

The request processing unit 7 determines whether to allow or disallow the execution of the requested recognition processing (recognition processing on image data), etc., using the estimated range of the processing load or the estimated processing load. If it is determined that the requested recognition processing is allowed, the request processing unit 7 executes the recognition processing.

Figure 2:
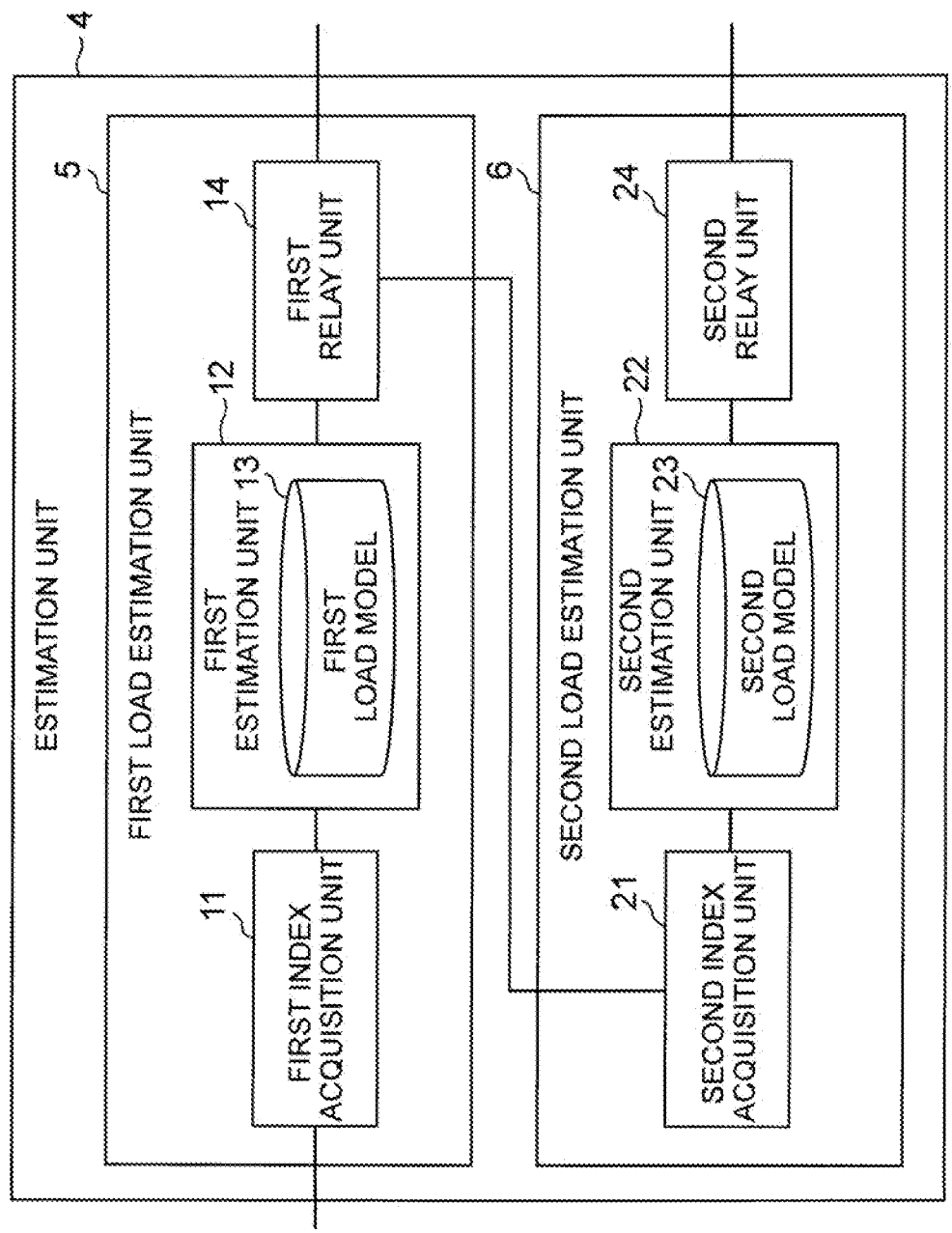
FIG. 2 It depicts a block diagram more specifically showing the first load estimation unit 5 and the second load estimation unit 6 included in the estimation unit 4.

FIG. 2 is a block diagram showing more specifically the first load estimation unit 5 and the second load estimation unit 6 included in the estimation unit 4.

The first load estimation unit 5 is equipped with a first index acquisition unit 11, a first estimation unit 12, and a first relay unit 14. The first estimation unit 12 stores the first load model 13 in advance. The first load model 13 will be described later.

The second load estimation unit 6 is equipped with a second index acquisition unit 21, a second estimation unit 22, and a second relay unit 24. The second estimation unit 22 stores the second load model 23 in advance. The second load model 23 will be described later.

The first index acquisition unit 11 receives image data and a request for recognition processing on the image data from the communication unit 3 (see FIG. 1). The first index acquisition unit 11 reads at least one of the resolution of the image, the number of channels of the image, and the number of bits per pixel of the image represented by the header information of the image data from the header information as the first index. In the following explanation, the case where the resolution of the image is used as the first index is used as an example, but the operation of this exemplary embodiment is the same even when the number of channels or the number of bits per pixel is used as the first index.

The first estimation unit 12 estimates the range of the processing load of the recognition processing on the image data based on the resolution (first index) read from the header information by the first index acquisition unit 11 and the first load model 13. The first load model 13 is a model for deriving the range of the processing load of the recognition processing from the first index. The first load model 13 is learned in advance by machine learning and stored in the first estimation unit 12.

FIG. 3 is a schematic diagram of an example of the first load model 13. As shown schematically in FIG. 3, the range of the processing load (recognition processing time) of the recognition processing can be estimated from the resolution based on the first load model 13. As the resolution increases, the estimated minimum, average and maximum values of the recognition processing time, respectively, increase. This is also the case when the number of channels or the number of bits per pixel is used as the first index. The first estimation unit 12 estimates the range of the processing load (recognition processing time) of the recognition processing by applying the resolution to the first load model 13. In this exemplary embodiment, the first estimation unit 12 estimates the minimum, average and maximum values of the processing load of the recognition processing based on the resolution and the first load model 13, respectively. As a result, the range from the minimum value to the maximum value is obtained as the range of the processing load.

FIG. 4 is a schematic diagram showing an example of the estimated ranges of processing load. The example shown in FIG. 4 shows a case where image data 1, 2, 3, and 4 are sent from client 2, each separately. In other words, it does not show that the image data 1 to 4 were sent from client 2 at the same time. FIG. 4 also shows the estimation processing time (the time required to estimate the load range). The time required to obtain the first index (in this case, resolution) from the header information is almost zero, so the estimation processing time is 0 ms regardless of the image data.

The first relay unit 14 sends the image data, the request for recognition processing on the image data, and the range of processing load (recognition processing time) for the recognition processing estimated by the first estimation unit 12 to the determination unit 31 (see FIG. 7 below) equipped in the request processing unit 7. (See FIG. 7 below.). When an instruction to estimate the processing load is sent from that determination unit 31, the first relay unit 14 sends that instruction (instruction to estimate the processing load), the image data, and the request for recognition processing on that image data to the second index acquisition unit 21.

When the second index acquisition unit 21 receives the instruction (instruction to estimate the processing load), the image data, and the request for recognition processing on the image data, the second index acquisition unit 21 derives the number of human faces in the image as the second index based on the content of the image data (the image represented by the image data). The process to derive the number of human faces in the image can be a known process.

The second estimation unit 22 estimates the processing load of the recognition processing on the image data based on the number of human faces in the image (the second index) derived by the second index acquisition unit 21 and the second load model 23. The second load model 23 is a model for deriving the processing load of the recognition processing from the second index. The second load model 23 is learned in advance by machine learning and stored in the second estimation unit 22.

The following explanation is based on the case where the minimum, average and maximum values of the processing load of the recognition processing can be estimated respectively by applying the second index to the second load model 23. The average value shall be used as the estimated value of the processing load of the recognition processing. Based on the second index and the second load model 23, the minimum and maximum values of the processing load can also be estimated. However, in this exemplary embodiment, the second estimation unit 22 does not have to estimate for the minimum and maximum values of the processing load.

Figures 5, 6:
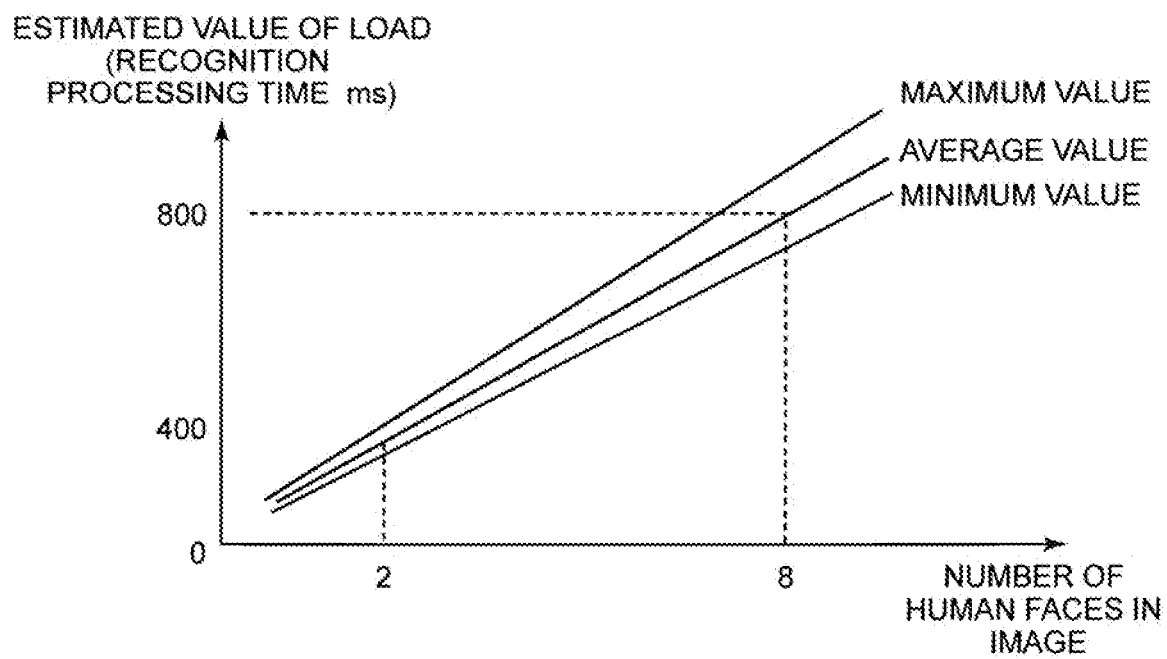
FIG. 5 It depicts a schematic diagram of an example of the second load model.
FIG. 6 It depicts a schematic diagram of an example of an estimated processing load.

FIG. 5 is a schematic diagram of an example of the second load model 23. As shown schematically in FIG. 5, the processing load of the recognition processing (recognition processing time) can be estimated from the number of human faces in the image based on the second load model 23. The second estimation unit 22 derives the average value of the processing load of the recognition processing by applying the number of human faces in the image to the second load model 23, and the derived value is used as the processing load of the recognition processing.

FIG. 6 is a schematic diagram showing an example of the estimated processing load. For the sake of convenience, the example shown in FIG. 6 illustrates the case where the second estimation unit 22 estimates the processing load of recognition processing with respect to image data 2 and 3, respectively, out of the image data 1 to 4 shown in FIG. 4. FIG. 6 also illustrates the estimation processing time as well. The second index (in this example, the number of human faces in the image) is information about the subject in the image, and it takes time to derive the second index. Therefore, the estimation processing time when the second estimation unit 22 estimates the processing load is longer than the estimation processing time when the first estimation unit 12 estimates the range of the processing load (see FIG. 4 and FIG. 6).

The second relay unit 24 sends the image data, the request for recognition processing on the image data, and the processing load of the recognition processing (recognition processing time) estimated by the second estimation unit 22 to the determination unit 31 (see FIG. 7 below) equipped in the request processing unit 7. (See FIG. 7 below.).

FIG. 7 is a block diagram showing the request processing unit 7 in more detail. The request processing unit 7 is equipped with a determination unit 31 and a recognition processing execution unit 34.

The determination unit 31 stores the request allowance number model 32 and the processing state table 33. Before explaining the operation of the determination unit 31, the request allowance number model 32 and the processing state table 33 will be explained.

The request allowance number model 32 is information that indicates the number of requests that can execute recognition processing at the same time, which is defined for each load range of recognition processing, and the number of requests that can execute recognition processing at the same time when the load range of recognition processing is not considered. Hereinafter, the former is referred to as the range allowance number and the latter as the total allowance number.

FIG. 8 is a schematic diagram showing an example of the request allowance number model 32. In the following description, for simplicity of explanation, the case where the recognition processing execution unit 34 executes recognition processing on image data by four CPU cores is used as an example. In addition, the case where a range of "0 to 500 ms" and a range of "over 500 ms" are defined as the load range of the recognition processing will be used as an example. The example shown in FIG. 8 indicates that up to four requests for recognition processing that fall into the "0 to 500 ms" load range are allowed, and up to two requests for recognition processing that fall into the "over 500 ms" load range are allowed. It also indicates that the total allowance number is four. Therefore, even if four requests for recognition processing that fall within the load range "0 to 500 ms" occur and two requests for recognition processing that fall within the load range "over 500 ms" occur, it does not mean that recognition processing on a total of six requests can be performed simultaneously, and the maximum number of requests that can be performed simultaneously is four.

The values set as the request allowance number model 32 are fixed values. However, the values shown in FIG. 8 are examples, and the values determined as the request allowance number model 32 are not limited to the example shown in FIG. 8.

The processing state table 33 is a table that stores the number of requests for which recognition processing is being performed for each load range of recognition processing and the total number of those requests. The processing state table 33 is updated according to the execution s of recognition processing by the recognition processing execution unit 34.

FIG. 9 is a schematic diagram of the processing state table 33. In the processing state table 33, the load range of recognition processing is defined in the same way as in the request allowance number model 32. In the example shown in FIG. 9, for recognition processing requests that fall within the load range "0 to 500 ms", it indicates that recognition processing for one request is being performed. For the recognition processing requests that fall in the load range "over 500 ms", it indicates that the recognition processing for two requests is being executed. Therefore, the total number of requests for which recognition processing is being performed is 3.

When a new request occurs, if the condition that the total value in the processing state table 33 (see FIG. 9) is less than the total allowance number (see FIG. 8) at that time and the number of requests in the range corresponding to the load of recognition processing according to that request is less than the range allowance number (see FIG. 8) for that range is satisfied, then the execution of the recognition processing according to the request can be allowed.

The combination of the request allowance number model 32 and the processing state table 33 can be said to be information that indicates the available computing resources.

Next, the operation of the determination unit 31 will be explained. In the following explanation, it is assumed that the determination unit 31 stores the request allowance number model 32 shown in FIG. 8 and the processing state table 33 shown in FIG. 9.

First, let us describe a case where the determination unit 31 receives, from the first relay unit 14, image data, a request for recognition processing on the image data, and a range of processing load (recognition processing time) for the recognition processing estimated by the first estimation unit 12. In this case, the determination unit 31 determines whether to allow or disallow the execution of recognition processing on that image data, or whether to estimate the processing load by the second estimation unit 22, based on the range of the processing load, the request allowance number model 32 and the processing state table 33. This operation will now be described in more detail.

The determination unit 31 selects the load range of the recognition processing that overlaps with the range of the processing load received from the first relay unit 14, from the processing state table 33 (which can also be the request allowance number model 32). The load range of recognition processing to be selected at this time is as follows. The load range of the recognition processing to be selected at this time is not necessarily one, and multiple load ranges may be selected.

If the selected load range is one, the determination unit 31 determines whether to allow or disallow the execution of recognition processing on image data in that load range based on the request allowance number model 32 and the processing state table 33. If the selected load range is one, the determination result is either allowed or disallowed.

For example, the range of recognition processing that overlaps with the range of processing load (minimum value 600, maximum value 2000) according to the image data 1 shown in FIG. 4 is only "over 500 ms". At this time, the total value in the processing state table 33 (see FIG. 9) is less than the total allowance number (see FIG. 8). However, the number of requests (see FIG. 9) in "over 500 ms" has reached the range allowance number (see FIG. 8) for that range. Therefore, the determination unit 31 determines that the execution of recognition processing on image data 1 is not allowed.

For example, the range of recognition processing that overlaps with the range of processing load (minimum value 100, maximum value 300) according to the image data 4 shown in FIG. 4 is only "0 to 500 ms". At this time, the total value in the processing state table 33 (see FIG. 9) is less than the total allowance number (see FIG. 8). Also, the number of requests (see FIG. 9) in "0 to 500 ms" is less than the range allowance number (see FIG. 8) for that range. Therefore, the determination unit 31 determines that the execution of recognition processing on image data 4 is allowed.

When there are multiple selected load ranges, the determination unit 31 determines whether the execution of recognition processing on image data is allowed or not for each individual load range. If all the determination results obtained for each individual load range are "Allowed", the determination unit 31 finally determines that the execution of recognition processing on the image data is allowed. Similarly, if all the determination results obtained for each load range are "Disallowed", the determination unit 31 finally determines that the execution of recognition processing on the image data is not allowed.

If the determination results obtained for each individual load range include the determination result of "Allowed" and the determination result of "Disallowed", the determination unit 31 determines that the processing load is to be estimated by the second estimation unit 22.

For example, the ranges of recognition processing that overlap with the range of processing load (minimum value 200, maximum value 1200) according to the image data 2 shown in FIG. 4 are "0 to 500 ms" and "over 500 ms". In this case, the result of "Allowed" is obtained for "0 to 500 ms", and the result of "Disallowed" is obtained for "over 500 ms". Therefore, in this case, the determination unit 31 determines that the processing load is to be estimated by the second estimation unit 22. The same applies to the determination for image data 3 shown in FIG. 4.

FIG. 10 illustrates the determination results in case the range of processing loads shown in FIG. 4 is given. In FIG. 10, a column showing the determination result is added to the table shown in FIG. 4.

If the determination result to estimate the processing load is obtained by the second estimation unit 22, the determination unit 31 sends an instruction to estimate the processing load to the first relay unit 14. As a result, the range of the processing load is estimated by the second estimation unit 22.

In the case of determining that the execution of the recognition processing on the image data is disallowed, the determination unit 31 sends information to the effect that the execution of the recognition processing in response to the request is disallowed to the client 2 via the communication unit 3 (see FIG. 1). In other words, the determination unit 31 sends information to the communication unit 3 to the effect that the execution of the recognition processing according to the request is disallowed, and the communication unit 3 sends the information to the client 2.

If it is determined that the execution of recognition processing on the image data is allowed, the determination unit 31 sends the image data and the request for recognition processing on the image data to the recognition processing execution unit 34.

Next, the following describes a case where the determination unit 31 receives, from the second relay unit 24, image data, a request for recognition processing on the image data, and a processing load (recognition processing time) of the recognition processing estimated by the second estimation unit 22. In this case, the determination unit 31 determines whether the execution of the recognition processing on that image data is allowed or not, based on that processing load, the request allowance number model 32 and the processing state table 33. If the processing load is given instead of the range of the processing load, the determination result is either to allow or disallow the execution of the recognition processing on the image data. This operation is described in more detail below.

The determination unit 31 selects the load range of the recognition processing that includes the processing load value received from the second relay unit 24, from the processing state table 33 (which can also be the request allowance number model 32). The load range of the recognition processing to be selected at this time is one. The determination unit 31 determines whether to allow or disallow the execution of recognition processing on the image data in that load range based on the request allowance number model 32 and the processing state table 33.

For example, the value of the processing load (800 ms) according to the image data 2 shown in FIG. 6 is included in the load range "over 500 ms" for recognition processing, so the determination unit 31 selects "over 500 ms" as the load range for recognition processing. At this time, the total value in the processing state table 33 (see FIG. 9) is less than the total allowance number (see FIG. 8). However, the number of requests (see FIG. 9) in "over 500 ms" has reached the range allowance number (see FIG. 8) for that range. Therefore, the determination unit 31 determines that the execution of recognition processing on image data 2 is disallowed.

For example, since the value of the processing load (400 ms) according to the image data 3 shown in FIG. 6 is included in the load range "0 to 500 ms" of the recognition processing, the determination unit 31 selects "0 to 500 ms" as the load range of the recognition processing. At this time, the total value in the processing state table 33 (see FIG. 9) is less than the total allowance number (see FIG. 8). Also, the number of requests (see FIG. 9) in "0 to 500 ms" is less than the range allowance number (see FIG. 8) for that range. Therefore, the determination unit 31 determines that the execution of recognition processing on image data 3 is allowed.

FIG. 11 illustrates the determination results in case the processing load shown in FIG. 6 is given. In FIG. 11, a column showing the determination result is added to the table shown in FIG. 6.

If it is determined that the execution of recognition processing on the image data is disallowed, the determination unit 31 sends information to the effect that the execution of the recognition processing in response to the request is disallowed to the client 2 via the communication unit 3 (see FIG. 1). If it is determined that the execution of recognition processing on the image data is allowed, the determination unit 31 sends the image data and the request for recognition processing on the image data to the recognition processing execution unit 34. These points are the same as in the case where the determination is based on the range of processing load.

The recognition processing execution unit 34 executes recognition processing on image data. In other words, when it is determined that the execution of recognition processing on the image data is allowed and the image data and the request for recognition processing on the image data are received from the determination unit 31, the recognition processing execution unit 34 executes the recognition processing on the image data. For example, the recognition processing execution unit 34 recognizes who the person in the image shown by the image data is.

The recognition processing execution unit 34 can perform the recognition processing in a known manner. This is also true when the media data is sound data or video data.

The communication unit 3 is realized, for example, by a CPU of a computer that operates according to a media data processing program and a communication interface of the computer. For example, the CPU can read the media data processing program from a program recording medium such as a program storage device of the computer, and operate as the communication unit 3 according to the program and using the communication interface of the computer. The estimation unit 4 equipped with the first load estimation unit 5 including the first index acquisition unit 11, the first estimation unit 12, and the first relay unit 14, and the second load estimation unit 6 including the second index acquisition unit 21, the second estimation unit 22, and the second relay unit 24, and the request processing unit 7 including the determination unit 31 and the recognition processing execution unit 34 are, for example, realized by the CPU of the computer operating according to the media data processing program. For example, the CPU can read the media data processing program from the program recording medium as described above, and operate as the estimation unit 4 and the request processing unit 7 in accordance with the program. In addition, the recognition processing execution unit 34 is more specifically realized by a plurality of CPU cores.

Figure 12:
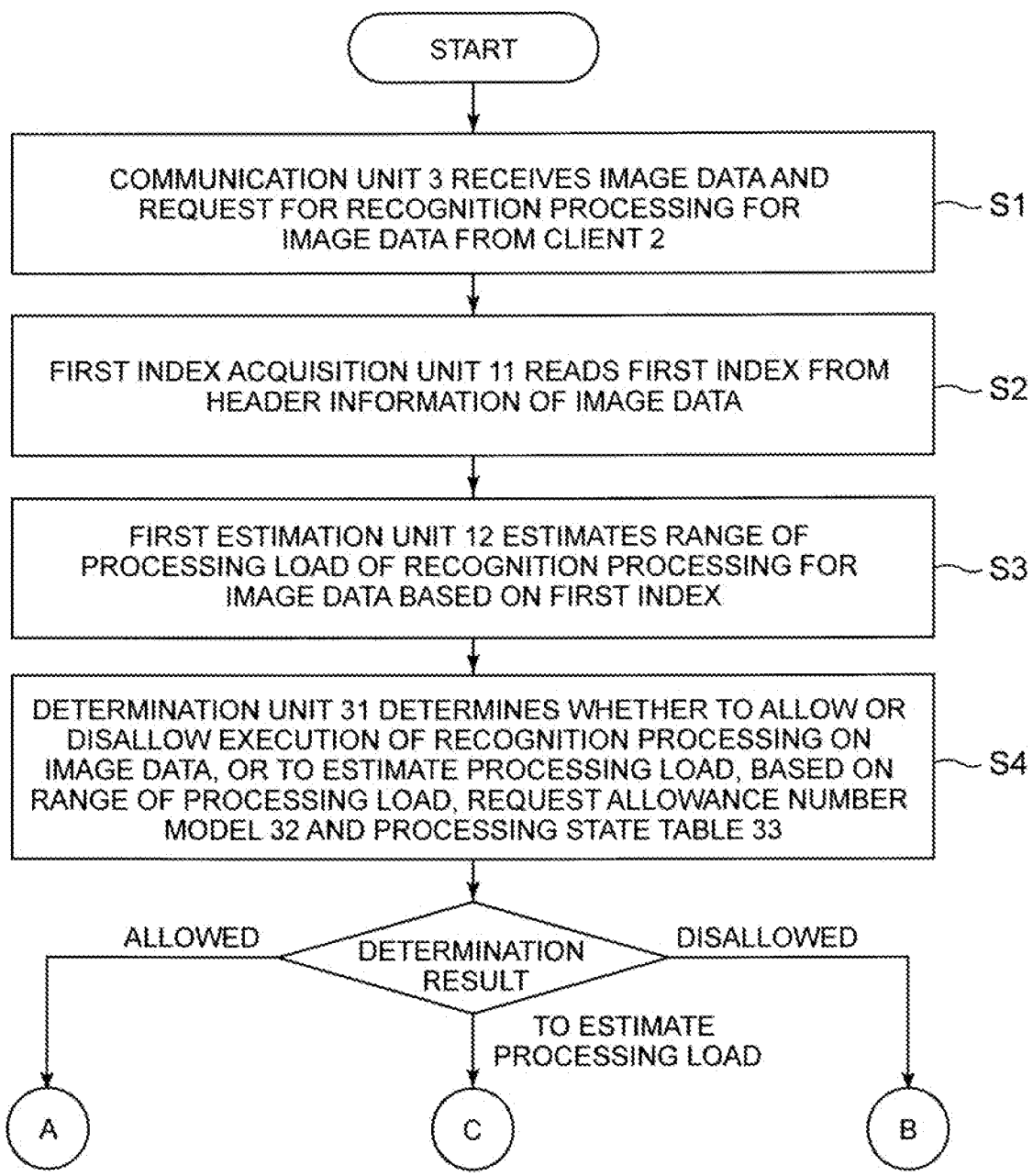
FIG. 12 It depicts a flowchart showing an example of the processing process of the exemplary embodiment of the present invention.
Figure 13:
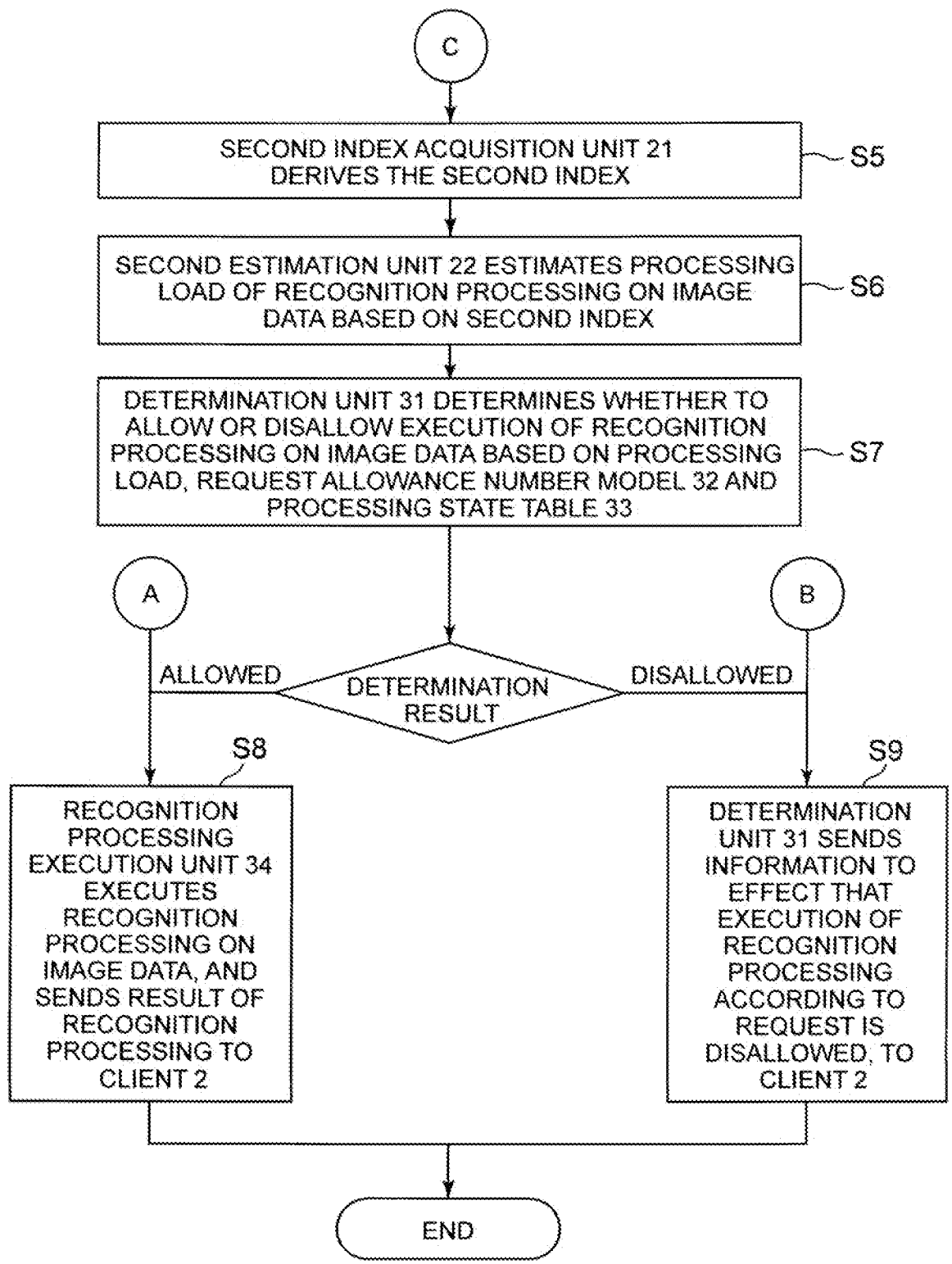
FIG. 13 It depicts a flowchart showing an example of the processing process of the exemplary embodiment of the present invention.

Next, the processing process is explained. FIG. 12 and FIG. 13 are flowcharts showing an example of the processing process of the exemplary embodiment of the present invention. Detailed explanations are omitted for matters that have already been explained.

First, the communication unit 3 of the server 1 receives the image data and the request for recognition processing on the image data from the client 2 (Step S1).

Next, the first index acquisition unit 11 reads the first index (in this example, the resolution of the image) from the header information of the image data (Step S2).

Next, the first estimation unit 12 estimates the range of the processing load of the recognition processing on the image data based on the first index (Step S3). The first relay unit 14 sends the range of the processing load, along with the image data and other data, to the determination unit 31.

Next, the determination unit 31 determines whether to allow or disallow the execution of recognition processing on the image data, or to estimate the processing load, based on the range of the processing load estimated in step S3, the request allowance number model 32 and the processing state table 33 (step S4).

If the determination result in step S4 is "Allowed", the recognition processing execution unit 34 executes the recognition processing on the image data. Then, the recognition processing execution unit 34 sends the result of the recognition processing to the client 2 via the communication unit 3 (Step S8, see FIG. 13). If the determination result in Step S4 is "Allowed", the determination unit 31 updates the processing state table 33.

If the determination result in step S4 is "Disallowed", the determination unit 31 sends information to the effect that the execution of the recognition processing according to the request is disallowed, to the client 2 via the communication unit 3 (step S9, see FIG. 13).

If the determination result of "To estimate processing load" is obtained in Step S4, the determination unit 31 sends an instruction to estimate the processing load to the first relay unit 14, and the first relay unit 14 sends the instruction, the image data, and the request for recognition processing on the image data to the second index acquisition unit 21. The second index acquisition unit 21 then derives the second index (in this example, the number of human faces in the image represented by the image data) (Step S5).

Next, the second estimation unit 22 estimates the processing load of recognition processing on the image data based on the second index (Step S6). The second relay unit 24 sends the processing load, along with the image data and other data, to the determination unit 31.

Next, the determination unit 31 determines whether to allow or disallow the execution of recognition processing on the image data based on the processing load estimated in step S6, the request allowance number model 32 and the processing state table 33 (step S7).

If the determination result in step S7 is "Allowed", the recognition processing execution unit 34 executes the recognition processing on the image data. Then, the recognition processing execution unit 34 sends the result of the recognition processing to the client 2 via the communication unit 3 (Step S8). If the determination result in step S7 is "Allowed," the determination unit 31 updates the processing state table 33.

If the determination result in step S7 is "Disallowed," the determination unit 31 sends information to the effect that the execution of the recognition processing according to the request is disallowed, to the client 2 via the communication unit 3 (step S9).

The process is terminated at step S8 or step S9. If the communication unit 3 receives the image data and request from the client 2 again, the process from step S1 onward is repeated.

In step S9, the determination unit 31 may send an instruction, to the client 2 via the communication unit 3, to send a request for recognition processing on the image data to the server 1 again after a certain period of time, together with a notification to the effect that the request has been disallowed. After receiving this instruction, the client 2 can send the image data and the request for recognition processing on the image data to the server 1 again after a certain period of time.

In this exemplary embodiment, the first index acquisition unit 11 reads the first index from the header information of the image data in step S2, and the first estimation unit 12 estimates the range of the processing load based on the first index in step S3. Since it takes very little time to acquire the first index (in this case, resolution) from the header information, the estimation processing time (processing time for steps S2-S3) is almost 0 ms, regardless of the image data.

Then, if "Allowed" is determined in step S4, step S8 is executed immediately. Therefore, in this case, the time until the end of the recognition processing (response time) can be shortened. In addition, if "Disallowed" is determined in step S4, step S9 is immediately executed, and the time until the notification of disallowance is sent to the client 2 can also be shortened.

If the determination result of "To estimate processing load" is obtained in Step S4, the second index acquisition unit 21 derives the second index in Step S5, and the second estimation unit 22 estimates the processing load based on the second index in Step S6. Since it takes time to derive the second index, the estimation processing time (processing time of steps S5-S6) is longer than the processing time of steps S2-S3. Therefore, the response time will be longer when the system moves to Step S8 after the processing of Steps S5 to S7. In addition, when moving to step S9 after the processing of steps S5 to S7, the time until the notification of disallowance is sent to client 2 will also be longer.

However, in the present invention, the process from step S5 onward is not necessarily executed for all requests from client 2. In the case of moving from step S4 to step S8, the response time will be short. In the case of moving from step S4 to step S9, the time until the notification of disallowance is sent to the client 2 can also be shortened.

Then, only when the determination result of "To estimate processing load" is obtained in step S4, the process from step S5 onward is executed.

Even if "Allowed" is not determined in Step S4, it may be determined as "Allowed" in Step S7, thus suppressing the decrease in the request processing rate.

Therefore, according to this exemplary embodiment, in media data recognition processing, where it is difficult to accurately estimate the load of recognition processing or where the load estimation process may take a long time to accurately estimate the load of recognition processing, it is possible to suppress the decrease in the request processing rate while suppressing the increase in response time.

FIG. 14 illustrates the determination results and response time when this exemplary embodiment is applied to the image data 1 to 4 shown in FIG. 4. In FIG. 14, the process of steps S2 to S4 (see FIG. 12.) is the first stage, and the process of steps S5 to S7 (see FIG. 13) is the second stage.

The estimation processing time in the first stage is represented by $T_1$, and the estimation processing time in the second stage is represented by $T_2$. The estimation processing time $T_1$ is the processing time of steps S2-S3, and the estimation processing time $T_2$ is the processing time of steps S5-S6. The time for the determination process in steps S4 and S7 is assumed to be almost 0 ms. When the determination result of "To estimate processing load" is obtained in step S4, the second stage is proceeded and the determination result of "Allowed" or "Disallowed" is obtained in step S7.

The response time is the sum of the estimation processing time in the case where the determination result is "Allowed" in steps S4 and S7, and the time required for the recognition processing in step S8. Therefore, the response time is obtained when the determination result is "Allowed". When the determination result is "Allowed" in Step 4, the response time is the sum of the estimation processing time $T_1$ and the sum of the time required for the recognition processing. If it is determined to be "Allowed" in step S7, the sum of the estimation processing time $T_1$, the estimation processing time $T_2$, and the time required for recognition processing is the response time. In the example shown in FIG. 14, the time required for recognition processing on image data 3 is 400 ms, and the time required for recognition processing on image data 4 is 200 ms.

In the example shown in FIG. 14, when image data 1 to 4 are given individually, the determination result of "Allowed" is obtained for the request for recognition processing on image data 3 and the request for recognition processing on image data 4. Therefore, the request processing rate is 50%. The average response time is (600+200)/2=400 ms.

FIG. 15 shows the determination result and response time in the case where only the first stage is applied to the image data 1 to 4 shown in FIG. 4 and only the determination result of either "Allowed" or "Disallowed" is assumed to be obtained in Step S4. Here, when the determination result of "To estimate processing load" is obtained in Step S4, the determination result shall be regarded as the determination result of "Disallowed". It is also assumed that the time required for recognition processing on image data 4, etc., is the same as in the case shown in FIG. 14.

In the example shown in FIG. 15, when image data 1 to 4 are given individually, the determination result of "Allowed" is obtained for the request for recognition processing on image data 4. Therefore, the request processing rate is 25%. Also, the average response time is 200 ms.

FIG. 16 shows the determination result and response time in the case where only the second stage is applied to the image data 1 to 4 shown in FIG. 4 and it is assumed that either "Allowed" or "Disallowed" is obtained in step S7. It is assumed that the time required for the recognition processing on image data 3 and the time required for the recognition processing on image data 4 are the same as in the case shown in FIG. 14.

In the example shown in FIG. 16, when image data 1 to 4 are given individually, the determination result of "Allowed" is obtained for the request for recognition processing on image data 3 and the request for recognition processing on image data 4. Therefore, the request processing rate is 50%. In addition, the average response time is (600+400)/2=500 ms.

Compare the case where the exemplary embodiment of the present invention is applied to image data 1 to 4 (see FIG. 14) with the case where only the first stage is applied to image data 1 to 4 (see FIG. 15). When only the first stage is applied, the average response time is shorter than when the exemplary embodiment of the present invention is applied, but the request processing rate is lower than when the exemplary embodiment of the present invention is applied (see FIG. 14 and FIG. 15).

The case where the exemplary embodiment of the present invention is applied to image data 1 to 4 (see FIG. 14) and the case where only the second stage is applied to image data 1 to 4 (see FIG. 16) are compared. When only the second stage is applied, the request processing rate is the same as when the exemplary embodiment of the present invention is applied, but the average response time is longer than when the exemplary embodiment of the present invention is applied.

As described above, according to the exemplary embodiment of the present invention can suppress the decrease in the request processing rate while suppressing the increase in response time.

In the above exemplary embodiment, the case where the resolution of an image is used as the first index is described as an example, but the number of channels or the number of bits per pixel can also be used as the first index.

Next, a variant of the exemplary of the present invention will be explained.

In the above exemplary embodiment, the case where the media data is image data was used as an example. The media data may also be sound data or video data (moving image data).

When the media data is sound data, the header information of the sound data represents, for example, attribute values such as the time length of the sound, the number of channels of the sound, and the bit rate. The time length of a sound is the entire recording time (recording time) of the sound in the sound data, which may include a period of silence. The number of channels of a sound is, for example, 1 if the sound is monaural, and 2 if the sound is stereo.

When the media data is sound data, the first index acquisition unit 11 (see FIG. 2) equipped in the first load estimation unit 5 reads at least one of the time length of the sound, the number of channels of the sound, and the bit rate represented by the header information of the sound data from the header information as the first index. Then, the first estimation unit 12 equipped in the first load estimation unit 5 estimates the range of the processing load of the recognition processing on the sound data based on the first index and the first load model 13. In this case, a model for deriving the range of the processing load of the recognition processing from the first index obtained from the header information of the sound data can be generated in advance by machine learning, and the model can be stored in the first estimation unit 12 as the first load model 13. In this case, it can be said that the first load estimation unit 5 estimates the range of the processing load of the recognition processing on the sound data based on at least one of the time length, the number of channels, and the bit rate of the sound represented by the header information of the sound data.

The second index acquisition unit 21 (see FIG. 2) equipped in the second load estimation unit 6 derives the information of the time interval in which a predetermined sound occurs in the sound data as a second index based on the content of the sound data. Examples of the information of the time interval in which the predetermined sound occurs include, for example, the length of the time interval in which a human voice occurs within the time length of the aforementioned sound, or the length of the time interval in which the sound of an object breaking occurs within the time length of the aforementioned sound. However, the information on the time interval in which a predetermined sound occurs is not limited to the above examples. The process of deriving the information of the time interval in which the predetermined sound occurs can be any known process. Then, the second estimation unit 22 equipped in the second load estimation unit 6 estimates the processing load of the recognition processing on the sound data based on the second index and the second load model 23. In this case, a model for deriving the processing load of the recognition processing from the second index can be generated in advance by machine learning, and the model can be stored in the second estimation unit 22 as the second load model 23. The second load model 23 may be a model that can derive the maximum and minimum values of the processing load as well as the values of the processing load. In this case, the second load estimation unit 6 can be said to estimate the processing load of the recognition processing on the sound data based on the information of the time interval in which the predetermined sound occurs in the sound data.

In addition, the recognition processing execution unit 34 (see FIG. 7) equipped in the request processing unit 7 executes, for example, the process of recognizing whose voice the sound data represents and what sound the sound data represents.

When the media data is video data, the header information of the video data represents, for example, attribute values such as resolution, the number of channels, the number of bits per pixel, and video time length. The resolution, the number of channels, and the number of bits per pixel in video data are the same as the resolution, the number of channels, and the number of bits per pixel in image data. The time length of the video is the entire recording time of the video in the video data.

When the media data is video data, the first index acquisition unit 11 (see FIG. 2) equipped in the first load estimation unit 5 reads at least one of the resolution, the number of channels, the number of bits per pixel, and video time length represented by the header information of the video data from the header information as the first index. Then, the first estimation unit 12 equipped in the first load estimation unit 5 estimates the range of the processing load of the recognition processing on the video data based on the first index and the first load model 13. In this case, a model for deriving the range of the processing load of the recognition processing from the first index obtained from the header information of the video data can be generated in advance by machine learning, and the model can be stored in the first estimation unit 12 as the first load model 13. In this case, the first load estimation unit 5 can be said to estimate the range of the processing load of recognition processing on the video data based on at least one of the resolution, the number of channels, the number of bits per pixel, and the time length of the video represented by the header information of the video data.

The second index acquisition unit 21 (see FIG. 2) equipped in the second load estimation unit 6 derives information about the subject in the video as the second index based on the content of the video data (the video represented by the video data). An example of the information on the subject in the video is, for example, the number of human faces in the video. However, the information on the subject in the video is not limited to the above examples. The process of deriving the information on the subject in the video can be any known process. Then, the second estimation unit 22 equipped in the second load estimation unit 6 estimates the processing load of the recognition processing on the video data based on the second index and the second load model 23. In this case, a model for deriving the processing load of the recognition processing from the second index can be generated in advance by machine learning, and the model can be stored in the second estimation unit 22 as the second load model 23. The second load model 23 may be a model that can derive the maximum and minimum values of the processing load as well as the values of the processing load. In this case, the second load estimation unit 6 can be said to estimate the processing load of the recognition processing on the video data based on the information about the subject in the video represented by the video data.

In addition, the recognition processing execution unit 34 (see FIG. 7), which is equipped in the request processing unit 7, executes a process to recognize, for example, who is in the video represented by the video data.

Figure 17:
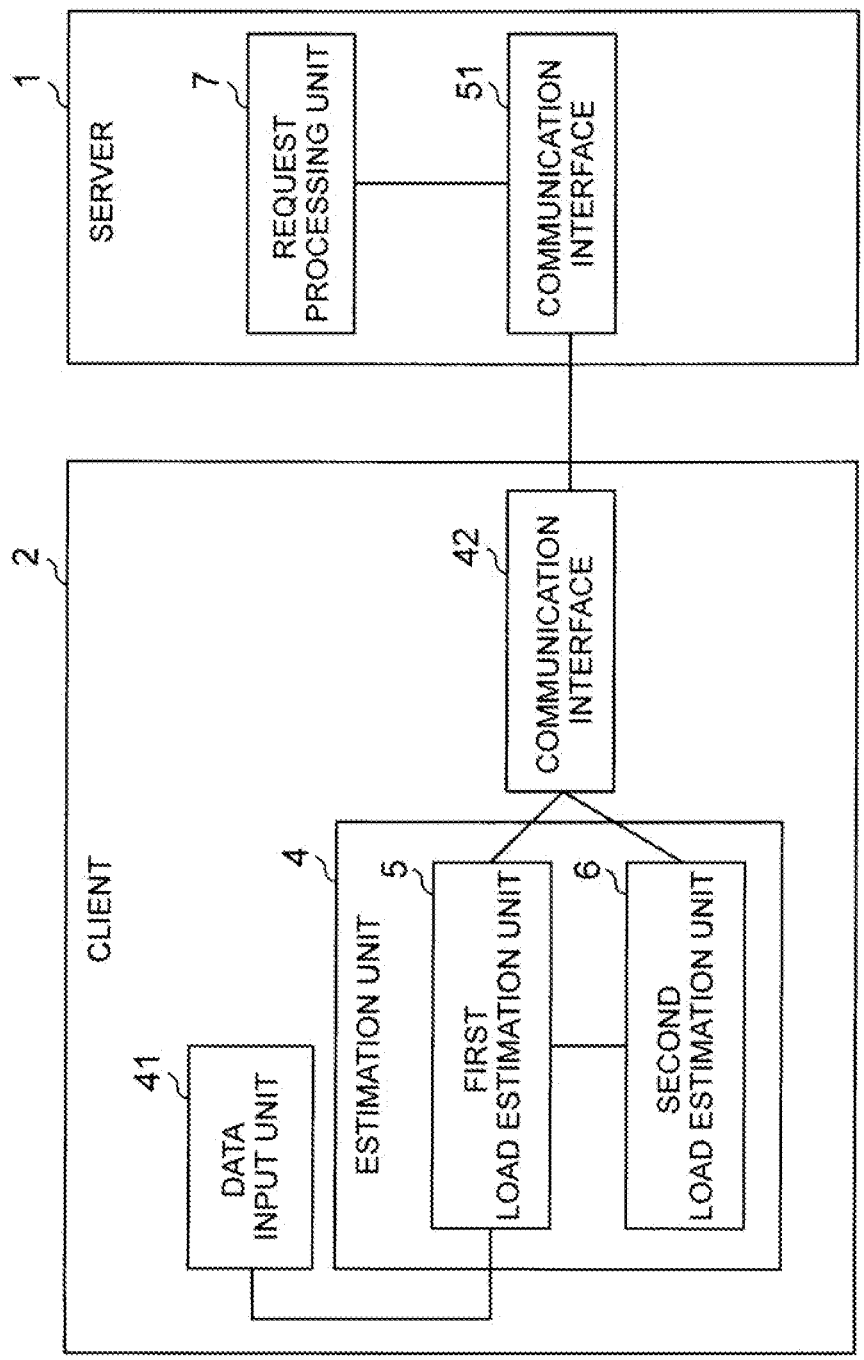
FIG. 17 It depicts a block diagram showing an example of a media data processing system in which the estimation unit 4 is installed in the client and the request processing unit 7 is installed in the server.

In the above exemplary embodiment, the case where the server 1 of the client-server system corresponds to the media data processing system was used as an example. It may be a configuration in which the estimation unit 4 equipped in the media data processing system is installed in the client and the request processing unit 7 is installed in the server. FIG. 17 is a block diagram showing such a configuration example.

In the configuration example shown in FIG. 17, the client 2 is equipped with a data input unit 41, an estimation unit 4, and a communication interface 42. The estimation unit 4 is equipped with a first load estimation unit 5 and a second load estimation unit 6. The server 1 is also equipped with a request processing unit 7 and a communication interface 51.

The estimation unit 4 with the first load estimation unit 5 and the second load estimation unit 6 is similar to the estimation unit 4 (see FIG. 1) in the above exemplary embodiment, and the configuration of the estimation unit 4 in this variation can also be represented as shown in FIG. 2. The request processing unit 7 is also similar to the request processing unit 7 (see FIG. 1) in the above exemplary embodiment, and the configuration of the request processing unit 7 in this variant can also be represented as shown in FIG. 7. Since the estimation unit 4 and the request processing unit 7 are the same as the estimation unit 4 and the request processing unit 7 in the above exemplary embodiment, a detailed explanation is omitted.

The data input unit 41 accepts input of media data (in this example, image data) and a request for recognition processing on the image data. For example, the data input unit 41 may be a data reading device (various data reading devices such as an optical disk drive) that reads the image data and the request for recognition processing from a recording medium on which the image data and the request for recognition processing are recorded. The data input unit 41 sends the input image data and the request for recognition processing to the first load estimation unit 5 (more specifically, the first index acquisition unit 11; see FIG. 2)).

The communication interface 42 of client 2 is the communication interface used to communicate with server 1. The communication interface 51 of the server 1 is the communication interface used to communicate with the client 2.

The first relay unit 14 (see FIG. 2) of the first load estimation unit 5 transmits the estimated processing load range, etc. to the server 1 via the communication interface 42. Also, the second relay unit 24 (see FIG. 2) of the second load estimation unit 6 sends the estimated processing load and other information to the server 1 via the communication interface 42. The server 1 receives such information via the communication interface 51.

The determination unit 31 (see FIG. 7) of the request processing unit 7 transmits information to the effect that the execution of the recognition processing in response to the request is disallowed, or instructions to estimate the processing load, to the client 2 via the communication interface 51. In addition, the recognition processing execution unit 34 (see FIG. 7) of the request processing unit 7 sends the results of the recognition processing in response to the request to the client 2 via the communication interface 51. The client 2 receives such information via the communication interface 42.

In the above exemplary embodiment, it can be said that steps S2 to S4 (see FIG. 12) after step S1 are the first stage, and steps S5 to S7 (see FIG. 13) are the second stage. The second stage may be further divided into multiple stages. An example of this case is described below.

In this example, it is assumed that the media data is image data and the second index is the number of human faces in the image. In this variant, the second index acquisition unit 21 derives the second index based on the content of the image data by means of two different algorithms. The two algorithms are referred to as the first algorithm and the second algorithm, respectively. The first algorithm is an algorithm that derives the second index (the number of human faces in the image) with lower accuracy than the second algorithm, but faster than the second algorithm. The second algorithm is an algorithm that derives the second index with higher accuracy than the first algorithm, but at a slower speed than the first algorithm.

Figure 18:
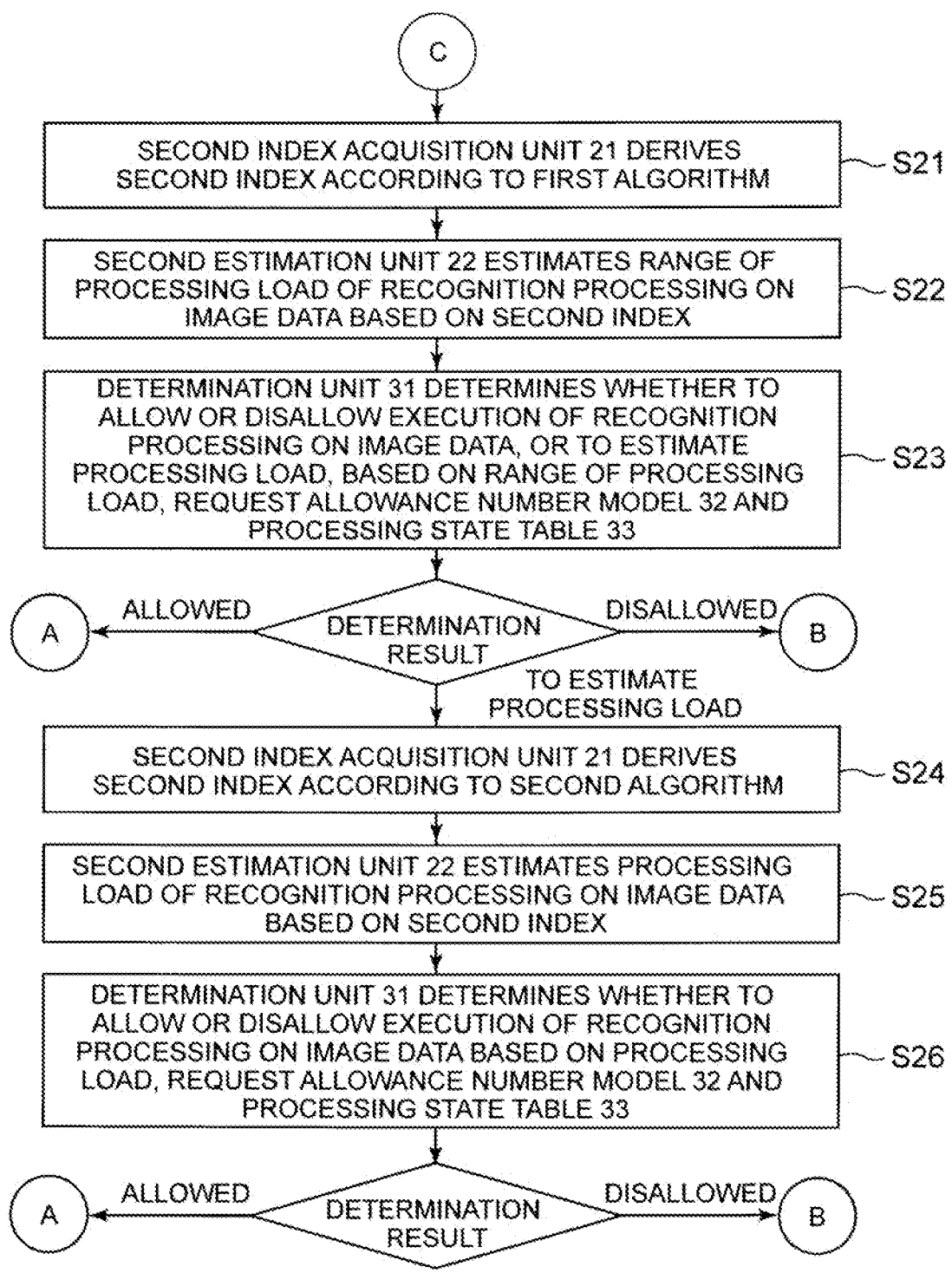
FIG. 18 It depicts a flowchart showing an example of the processing process in case the second stage is further divided into two stages.
Figure 19:
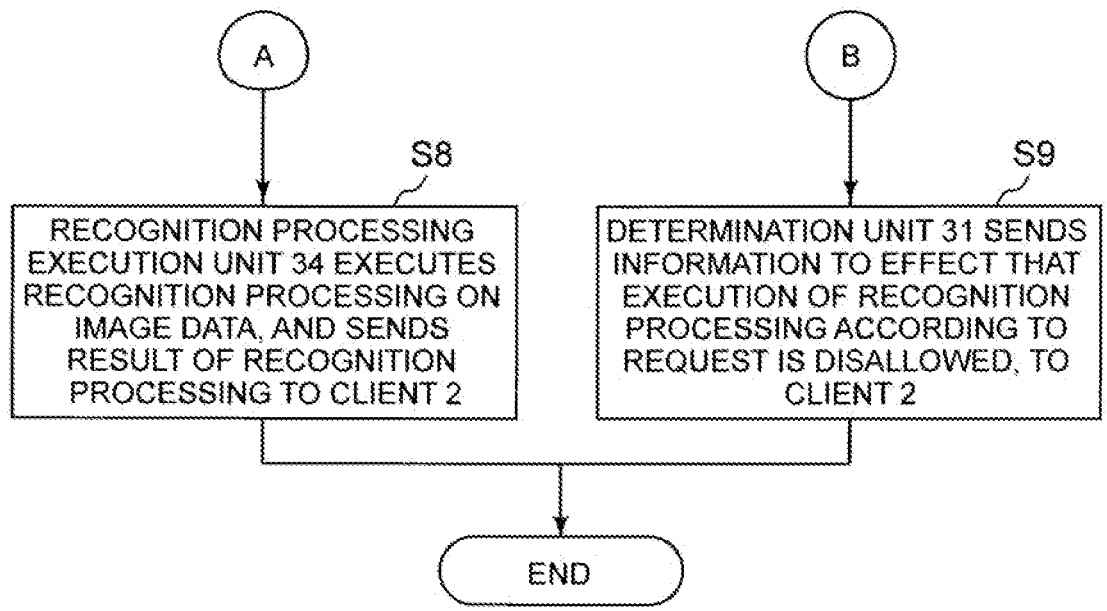
FIG. 19 It depicts a flowchart showing an example of the processing process in case the second stage is further divided into two stages.

FIG. 18 and FIG. 19 are flowcharts showing an example of the processing process when the second stage is further divided into multiple stages (two stages). The operations of steps S1 to S4 are the same as in the above exemplary embodiment. It is also the same as the above exemplary embodiment in that the process moves to Step S8 when it is determined to be "Allowed" in Step S4, and to Step S9 when it is determined to be "Disallowed" in Step S4. For this reason, the flowcharts shown in FIG. 18 and FIG. 19 omit the illustration of the processing of steps S1 to S4 (see FIG. 12). And in FIG. 18, the figure starts with the process in which the determination result of "To estimate processing load" is obtained in step S4 and the second index acquisition unit 21 derives the second index.

The second index acquisition unit 21 derives the second index (in this example, the number of human faces in the image represented by the image data) according to the first algorithm (Step S21).

Next, the second estimation unit 22 estimates the range of the processing load of the recognition processing on the image data based on the second index (Step S22). In step S22, the second estimation unit 22 can estimate the minimum, average, and maximum values of the processing load of the recognition processing, respectively, by applying the second index to the second load model 23 shown schematically in FIG. 5, for example. As a result, the range from the minimum value to the maximum value is obtained as the range of the processing load. The second relay unit 24 sends the estimated range of processing load to the determination unit 31 together with the image data and the request for recognition processing on the image data.

Next, the determination unit 31 determines whether to allow or disallow the execution of recognition processing on the image data, or to estimate the processing load, based on the range of the processing load estimated in step S22, the request allowance number model 32 and the processing state table 33 (step S23). The process of step S23 is the same as the process of step S4 (see FIG. 12).

If the determination result in step S23 is "Allowed", the recognition processing execution unit 34 executes the recognition processing on the image data. Then, the recognition processing execution unit 34 sends the result of the recognition processing to the client 2 via the communication unit 3 (Step S8, see FIG. 19). If the determination result in step S23 is "Allowed", the determination unit 31 updates the processing state table 33.

If the determination result in step S23 is "Disallowed", the determination unit 31 sends the information that the execution of the recognition processing according to the request is disallowed, to the client 2 via the communication unit 3 (step S9, see FIG. 19).

If the determination result of "To estimate processing load" is obtained in step S23, the determination unit 31 sends an instruction to estimate the processing load to the second relay unit 24, which in turn sends the instruction, the image data, and the request for recognition processing on the image data to the second index acquisition unit 21.

Then, the second index acquisition unit 21 derives the second index according to the second algorithm (Step S24). The processing time of step S24 is longer than that of step S21. However, the accuracy of the second index derived in step S24 is higher than the accuracy of the second index derived in step S21.

Next, the second estimation unit 22 estimates the processing load of the recognition processing on the image data based on the second index (step S25). The second relay unit 24 sends the processing load to the determination unit 31 together with the image data and the request for recognition processing on the image data.

Next, the determination unit 31 determines whether to allow or disallow the execution of recognition processing on the image data based on the processing load estimated in step S25, the request allowance number model 32 and the processing state table 33 (step S26).

The process of steps S25 and S26 is the same as the process of steps S6 and S7 shown in FIG. 13.

If the determination result in step S26 is "Allowed", the recognition processing execution unit 34 executes the recognition processing on the image data. Then, the recognition processing execution unit 34 sends the result of the recognition processing to the client 2 via the communication unit 3 (Step S8, see FIG. 19). If the determination result in step S26 is "Allowed", the determination unit 31 updates the processing state table 33.

If the determination result in step S26 is "Disallowed," the determination unit 31 sends the information that the execution of the recognition processing according to the request is disallowed, to the client 2 via the communication unit 3 (step S9, see FIG. 19).

In the above processing process, it can be said that the process of steps S21 to S23 is one stage, and the process of steps S24 to S25 is yet another stage. Thus, the process of this variation can be said to include three stages together with the first stage (steps S2 to S4 shown in FIG. 12). Thus, although we have described a process that includes three stages in this variation, the process may include many more stages.

This variation also has the effect of suppressing the decrease in the request processing rate while suppressing the increase in response time.

Figure 20:
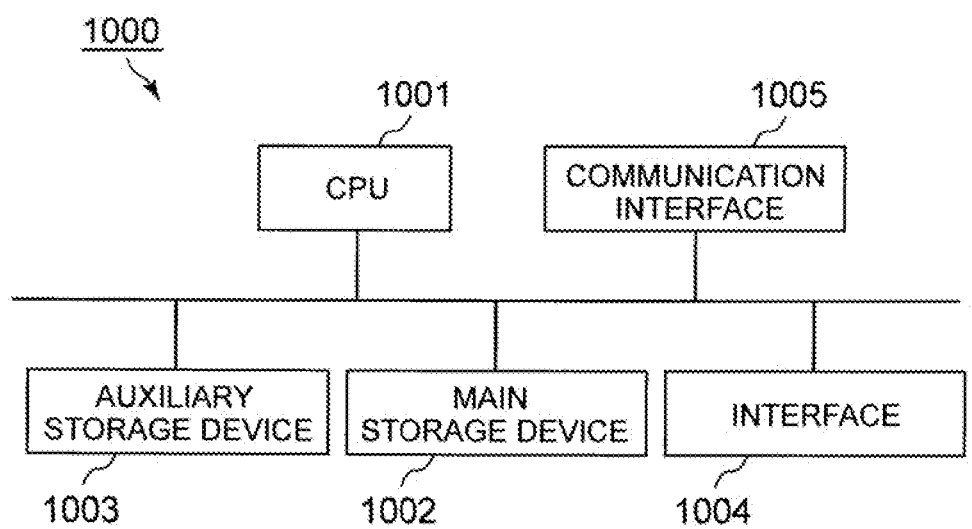
FIG. 20 It depicts a schematic block diagram of a computer configuration example for the media data processing system of the exemplary embodiment of the present invention.

FIG. 20 is a schematic block diagram showing an example of the configuration of the computer for the media data processing system of the above exemplary embodiment. The configuration of the computer pertaining to client 2 and server 1 in the variation shown in FIG. 17 is also represented in the same manner as shown in FIG. 20. The computer 100 is equipped with a CPU 1001, a main storage device 1002, an auxiliary storage device 1003, an interface 1004, and a communication interface 1005.

The media data processing system of the above exemplary embodiment is implemented by a computer 1000, the operation of which is stored in an auxiliary storage device 1003 in the form of a program. CPU 1001 reads the program from the auxiliary storage device 1003, expands it to the main memory device 1002, and executes the operation described in the above exemplary embodiment and variations thereof according to the program.

The auxiliary storage device 1003 is an example of a non-transitory tangible medium.

Other examples of non-transitory tangible media include magnetic disks, optical magnetic disks, CD-ROM (Compact Disk Read Only Memory), DVD-ROM (Digital Versatile Disk Read Only Memory), semiconductor memory, and the like, which are connected via an interface 1004. When the program is delivered to the computer 1000 via a communication line, the computer 1000 that receives the delivery may expand the program to the main memory device 1002 and execute the above process.

The program may also be a program for realizing part of the aforementioned processing.

Further, the program may be a difference program that realizes the aforementioned processing in combination with other programs already stored in the auxiliary storage device 1003.

Some or all of the components may be realized by general-purpose or dedicated circuitry, processors, or a combination of these. They may be configured by a single chip or by multiple chips connected via a bus. Some or all of each component may be realized by a combination of the above-mentioned circuitry, etc. and programs.

When some or all of each component is realized by multiple information processing devices, circuits, etc., the multiple information processing devices, circuits, etc. may be centrally located or distributed. For example, the information processing devices, circuits, etc. may be implemented as a client-and-server system, cloud computing system, etc., each of which is connected via a communication network.

Figure 21:
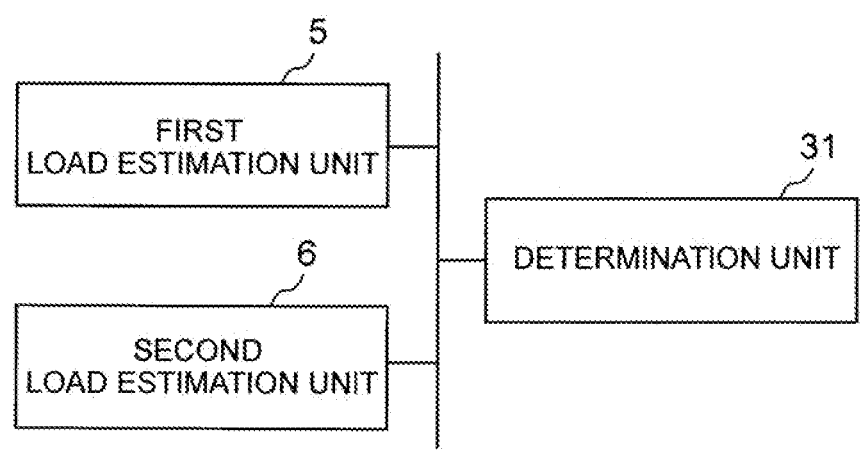
FIG. 21 It depicts a block diagram showing an overview of the media data processing system of the present invention.

Next, an overview of the present invention will be explained. FIG. 21 is a block diagram showing the overview of the media data processing system of the present invention. The media data processing system of the present invention is equipped with a first load estimation unit 5, a second load estimation unit 6, and a determination unit 31.

The first load estimation unit 5 estimates range of processing load of media data recognition processing based on header information of media data.

The second load estimation unit 6 estimates the processing load of the media data recognition processing based on content of the media data.

The determination unit 31 determines whether to allow or disallow execution of the media data recognition processing on the media data, or to estimate the processing load, based on the range of the processing load estimated by the first load estimation unit 5 and information indicating available computing resources (e.g., the request allowance number model 32 and the processing state table 33). Also, the determination unit 31 determines whether to allow or disallow the execution of the media data recognition processing on the media data, based on the processing load estimated by the second load estimation unit and the information indicating available computing resources.

The second load estimation unit 6 estimates the processing load of the media data recognition processing when the determination unit determines to estimate the processing load.

Such a configuration can suppress the decrease in the request processing rate while suppressing the increase in response time in media data recognition processing, where it is difficult to properly estimate the load.

The media data may be image data, the first load estimation unit 5 may estimate the range of the processing load of the media data recognition processing based on at least one of resolution, a number of channels, and a number of bits per pixel represented by the header information of the image data, and the second load estimation unit 6 may estimate the processing load of the media data recognition processing based on information about subject in image represented by the image data.

The media data may be sound data, the first load estimation unit 5 may estimate the range of the processing load of the media data recognition processing based on at least one of time length of sound, a number of channels, and bit rate represented by the header information of the sound data, and the second load estimation unit 6 may estimate the processing load of the media data recognition processing based on information of time interval in which predetermined sound occurs in the sound data.

The media data may be video data, the first load estimation unit 5 may estimate the range of the processing load of the media data recognition processing based on at least one of resolution, a number of channels, a number of bits per pixel, and video time length represented by the header information of the video data, and the second load estimation unit 6 may estimate the processing load of the media data recognition processing based on information about subject in video represented by the video data.

The first load estimation unit 5 may obtain a first index for estimating the processing load of the media data recognition processing based on the header information of the media data, and may estimate the range of the processing load of the media data recognition processing based on the first index, and the second load estimation unit 6 may obtain a second index for estimating the processing load of the media data recognition processing based on the content of the media data, and may estimate the processing load of the media data recognition processing based on the second index.

The second load estimation unit 6 may obtain the second index according to a first algorithm, and may estimate the range of the processing load of the media data recognition processing based on the second index, the determination unit 31 may determine whether to allow or disallow the execution of the media data recognition processing on the media data, or to estimate the processing load, based on the range of the processing load and the information indicating available computing resources, the second load estimation unit 6 may obtain the second index according to a second algorithm that can derive the second index with higher accuracy than the first algorithm when the determination unit determines to estimate the processing load, and may estimate the processing load of the media data recognition processing based on the second index, and the determination unit 31 may determine whether to allow or disallow the execution of the media data recognition processing on the media data based on the processing load and the information indicating available computing resources.

The media data processing system may comprise a recognition processing execution unit (e.g., the recognition processing execution unit 34) that executes the media data recognition processing when the determination unit 31 determines to allow the execution of the media data recognition processing on the media data.

Although the invention of the present application has been described above with reference to exemplary embodiments, the present application is not limited to the above exemplary embodiments. Various changes can be made to the configuration and details of the present invention that can be understood by those skilled in the art within the scope of the present invention.

POSSIBILITY OF INDUSTRIAL USE

The present invention is suitably applied to the determination of whether or not to allow the execution of media data recognition processing on media data.

REFERENCE SIGNS LIST

1 Server
2 Clients
3 Communication unit
4 Estimation unit
5 First load estimation unit
6 Second load estimation unit
7 Request processing unit
11 First index acquisition unit
12 First estimation unit
14 First relay unit
21 Second index acquisition unit
22 Second estimation unit
24 Second relay unit
31 Determination unit
34 Recognition processing execution unit

What is claimed is:

1. A media data processing system comprising:
a first load estimation unit that estimates range of processing load of media data recognition processing based on header information of media data;
a second load estimation unit that estimates the processing load of the media data recognition processing based on content of the media data; and
a determination unit that determines whether to allow or disallow execution of the media data recognition processing on the media data, or to estimate the processing load, based on the range of the processing load estimated by the first load estimation unit and information indicating available computing resources, and determines whether to allow or disallow the execution of the media data recognition processing on the media data, based on the processing load estimated by the second load estimation unit and the information indicating available computing resources,
wherein
the second load estimation unit estimates the processing load of the media data recognition processing when the determination unit determines to estimate the processing load.

2. The media data processing system according to claim 1, wherein
the media data is image data,
the first load estimation unit estimates the range of the processing load of the media data recognition processing based on at least one of resolution, a number of channels, and a number of bits per pixel represented by the header information of the image data, and the second load estimation unit estimates the processing load of the media data recognition processing based on information about subject in image represented by the image data.

3. The media data processing system according to claim 1, wherein
the media data is sound data,
the first load estimation unit estimates the range of the processing load of the media data recognition processing based on at least one of time length of sound, a number of channels, and bit rate represented by the header information of the sound data, and
the second load estimation unit estimates the processing load of the media data recognition processing based on information of time interval in which predetermined sound occurs in the sound data.

4. The media data processing system according to claim 1, wherein
the media data is video data,
the first load estimation unit estimates the range of the processing load of the media data recognition processing based on at least one of resolution, a number of channels, a number of bits per pixel, and video time length represented by the header information of the video data, and
the second load estimation unit estimates the processing load of the media data recognition processing based on information about subject in video represented by the video data.

5. The media data processing system according to claim 1, wherein
the first load estimation unit obtains a first index for estimating the processing load of the media data recognition processing based on the header information of the media data, and estimates the range of the processing load of the media data recognition processing based on the first index, and
the second load estimation unit obtains a second index for estimating the processing load of the media data recognition processing based on the content of the media data, and estimates the processing load of the media data recognition processing based on the second index.

6. The media data processing system according to claim 5, wherein
the second load estimation unit obtains the second index according to a first algorithm, and estimates the range of the processing load of the media data recognition processing based on the second index,
the determination unit determines whether to allow or disallow the execution of the media data recognition processing on the media data, or to estimate the processing load, based on the range of the processing load and the information indicating available computing resources,
the second load estimation unit obtains the second index according to a second algorithm that can derive the second index with higher accuracy than the first algorithm when the determination unit determines to estimate the processing load, and estimates the processing load of the media data recognition processing based on the second index, and
the determination unit determines whether to allow or disallow the execution of the media data recognition processing on the media data based on the processing load and the information indicating available computing resources.

7. The media data processing system according to claim 1, further comprising:
a recognition processing execution unit that executes the media data recognition processing when the determination unit determines to allow the execution of the media data recognition processing on the media data.

8. A media data processing method comprising:
estimating range of processing load of media data recognition processing based on header information of media data;
determining whether to allow or disallow execution of the media data recognition processing on the media data, or to estimate the processing load, based on the range of the processing load and information indicating available computing resources;
estimating the processing load of the media data recognition processing based on content of the media data when it is determined to estimate the processing load; and
determining whether to allow or disallow the execution of the media data recognition processing on the media data, based on the processing load and the information indicating available computing resources.

9. A non-transitory computer-readable recording medium in which a media data processing program is recorded, the media data processing program causing a computer to execute:
a first load estimation process of estimating range of processing load of media data recognition processing based on header information of media data;
a second load estimation process of estimating the processing load of the media data recognition processing based on content of the media data; and
a determination process of determining whether to allow or disallow execution of the media data recognition processing on the media data, or to estimate the processing load, based on the range of the processing load estimated in the first load estimation process and information indicating available computing resources, and of determining whether to allow or disallow the execution of the media data recognition processing on the media data, based on the processing load estimated in the second load estimation process and the information indicating available computing resources,
wherein the media data processing program causes the computer to execute:
the second load estimation process when it is determined to estimate the processing load in the determination process.

* * * * *